Dec. 27, 1955  W. RUSKA  2,728,397
SUBSURFACE SAMPLER
Filed March 19, 1951
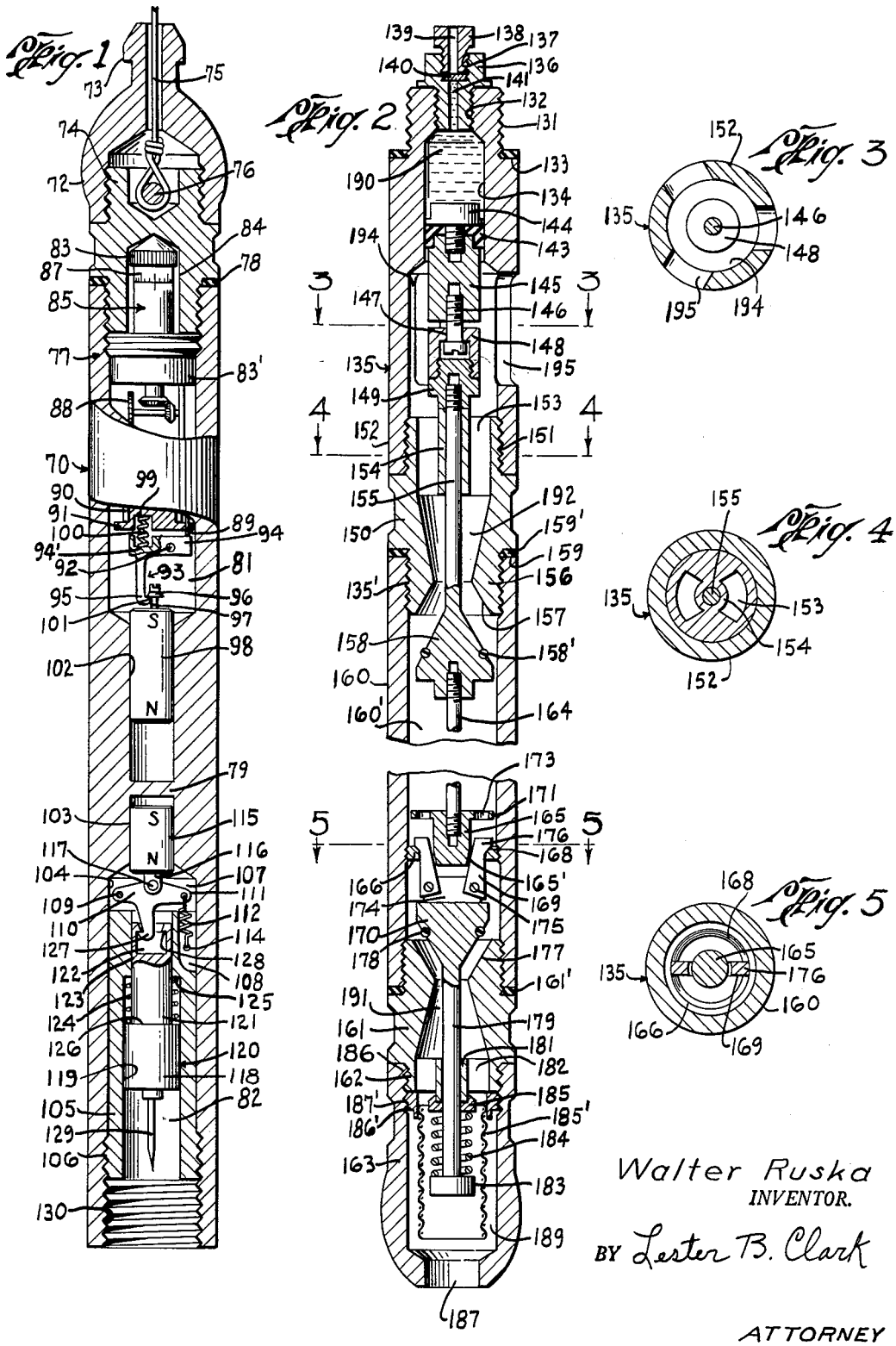
Walter Ruska
INVENTOR.
BY Lester B. Clark
ATTORNEY

United States Patent Office 2,728,397
Patented Dec. 27, 1955

2,728,397

SUBSURFACE SAMPLER

Walter Ruska, Houston, Tex., assignor to Ruska Instrument Corporation, Houston, Tex., a corporation of Texas Application March 19, 1951, Serial No. 216,393

7 Claims. (Cl. 166—64)

This invention relates to the procurement of samples within deep well bores, and more particularly to new and useful improvements in devices for obtaining samples under pressure and hence the conditions existing at the level of the sample taking. This application disclosing such invention is a continuation-in-part of my co-pending application, Serial Number 618,274, filed September 24, 1945, and now issued under issue date of December 4, 1951, as Patent No. 2,577,210.

The primary object of the invention is to provide a device of the class described which is of small radial dimensions and light in weight, and yet capable of effectively obtaining samples and withstanding the pressures existing at the level of sample taking.

Another object is to provide a device that can be set for operation at the end of a predetermined time interval, the device being lowered to the desired level preliminary to automatic operation for entrapping the sample when the time interval has elapsed.

Another object is to provide a sample taking device which is positive in action, and which is so constructed that it will effectively entrap a sample at the level at which a sample is desired.

Still another object is to provide a device having a sample chamber and a passage therethrough so that well fluids pass freely through the device while lowering to the sample taking position, means being provided for closing the passage and entrapping the desired sample within the chamber.

It is a further object of this invention to provide a device in which a magnet is protectively housed in a fluid tight chamber and initially held in retracted position for subsequent release by a time controlled device, to move toward a partition wall across the housing to attract a second magnet in another chamber bordered by the partition, so that the movement of the second magnet toward the partition sets in motion certain work performing mechanism by which a fluid sample is entrapped in the device.

A still further object is to provide a device which actuates in response to fluid pressure at the depth of sample taking after the timing mechanism initiates such operation.

It is yet another object of this invention to provide a device of this class having a timing device inclosed in a fluid-tight upper chamber separated from the lower housing by a partition thereacross.

It is a further object of this invention to provide a device of this class having such a partition with magnets on opposite sides thereof actuatable to move to the partition thereby setting in motion sample entrapping elements therebelow.

Still another and more specific object is to provide a device which includes a liquid chamber, and an air chamber, the liquid chamber having a piston which is subjected to pressure within the well, and means for releasing the liquid from the liquid chamber to the air chamber whereby the piston moves under the influence of the well pressure.

Another object is to provide a frangible seal for the liquid chamber, and time actuated means for breaking said seal.

A still further object is to provide a sample taking assembly from which the sample chamber may be removed and used as a shipping container, or from which the sample may be transferred to another container for shipment.

It is a further object of this invention to provide a device for this class which employs releasably mounted magnets operable by magnetic attraction to actuate its mechanism, thereby avoiding the use of batteries in the intense temperatures occurring in well bores.

The foregoing objects together with other objects and advantages of the invention will be more fully apparent from the following description taken in connection with the accompanying drawings in which:

Fig. 1 is a sectional elevation of the upper portion of a device embodying a preferred modification of the invention;

Fig. 2 is a sectional elevation of the lower portion of the device and constitutes a continuation of the structure shown in Fig. 1;

Fig. 3 is a sectional plan view taken along line 3—3 of Fig. 2;

Fig. 4 is a sectional plan view taken along line 4—4 of Fig. 2;

Fig. 5 is a sectional plan view taken along line 5—5 of Fig. 2.

The batteries employed in my prior Patent 2,577,210 do not always withstand the excessive heat encountered in well bores, and my present invention sets out to eliminate the use of batteries.

As shown in Figs. 1–5, the composite housing or upper barrel section 70 includes a hardened drag joint 72 which provides a fishing head 73, and which covers, and is connected to a wire line head 74. A wire line 75 may be connected to the pin 76 which extends transversely of the head 74 and is supported in the wall thereof at either end. The head 74 is connected to the clock section barrel 77 and the gasket 78 is interposed thereinbetween.

The clock section barrel 77 has the partition, wall, or diaphragm 79 extending transversely thereacross to divide the section into an upper or clock chamber 81 and a lower or air chamber 82. The clock spring winder head 83 of the clock mechanism or timing device 85 is received within the recess 84 of the wire line head 74 and the clock base 83′ is fitted within the upper bore 86 of the clock chamber 81. The rotary head or knurled knob 83 by which the clock spring is preset has a dependent skirt with spaced markings affording the dial 87 thereon, which is graduated preferably in minutes, and the rotation of the winder head 83 through a part revolution sets tension of the usual drive spring for the few mniutes interval of operation desired and indicated by the dial 87. The release of spring energy as controlled by conventional transmission or escapement mechanism, of which the transmission gearing is shown at 88, imparts the return part rotation to the stem of the winder head to turn a stem carried cam disc which upon reaching zero setting urges the plunger 89 downwardly to depress the bell crank arm 94.

The frame 90 which is anchored within the barrel 77 and which supports the transmission or escapement mechanism 88 terminates downwardly in the flange 91. The pin 92 extends across the chamber 81 and its ends are supported in the wall of the barrel section 77. The bell crank lever 93 is pivotally mounted on the pin 92 and the point or spear 95 of the lever engages under the head 96 of the pin 97 which extends from, and above the trip magnet 98. The plunger 89 is shown in Fig. 1 extending through the flange 91, which serves as a guide therefor. The face of the flange 91 is recessed at 99, and the arm 94 of the bell crank lever 93 is recessed at 94'; the spring 100 extends between and into the recesses urging the arm 94 in a counter-clockwise direction about pivot pin 92, as shown in Fig. 1, and plunger 89 contacts the arm 94 on the opposite side of the pin 92 from the spring 100 and maintains the bell crank lever 93 balanced until such time as the plunger 89 moves downwardly. Such balance will be obvious in view of the description hereinbelow.

After the clock mechanism 85 has been installed in the barrel 77 and head 74, the assembled barrel 77 and head 74 may be inverted so that the pin head 96 may force the spear 95 of the bell crank lever 94 to the left or clockwise, as shown in Fig. 1, and against the tension of the spring 100, until the head 96 passes the spear 95 so that the spring tension may force the spear 95 back to the right to yieldably lock against the surface 101 of the head 96. Then when the assembly is turned back into the upright position shown in Fig. 1, the gravity biased trip magnet 98 is releasably suspended by the bell crank lever 93 in the upper portion of the reduced diameter bore 102 and in spaced relation above the partition 79.

Below the partition 79 the barrel 77 has the reduced diameter bore 103 and therebelow the larger diameter bore 104. The sleeve 105 is inserted into the bore 104 and threadably connected to the barrel at 106. This sleeve 105 has the slot 107 at the top thereof and the slot 108 therebelow and merging into the slot 107. The pin 109 extends across the slot 107 and its ends are supported in the sleeve wall.

The trigger or hammer lock 110 is pivotally mounted upon the pin 109 at one end of its arm 111, and at the other end of its arm the upper end of the spring 112 is connected thereto, while the lower end of the spring is connected to the pin 114 which extends across the slot 108 and has its ends supported in the sleeve wall. The armature magnet 115 extends into the bore 103 and the plug 116 rigidly connected thereto pivotally connects the magnet to the pin or lug 117 on the arm 111 and thus the magnet 115 is releasably held in spaced relation to the partition 79 by the elastic force of the spring 112.

The hammer or plunger 120 has the cylindrical portion 118 slidable in the enlarged bore 119 of the sleeve 105, and the reduced diameter cylindrical portion 121, having the recess 122 in the upper end thereof, is slidable in the reduced diameter bore 123 of the sleeve. The spring 124, which bears upwardly against the internal shoulder 125 of the sleeve, and downwardly against the upper surface 126 of the portion 118, need only be compressed by forcing the plunger 120, and the spear or point 127 of the hammer lock or trigger 110 engages the internal shoulder 128 of the recess 122 and locks the plunger 120 so that the rupture pin 129 thereof is positioned above the lower end 130 of the barrel 77.

The lower housing section or barrel 135 of the composite housing 70 at its upper end is externally threaded at 131 and has the internally threaded bore 132 and provides the shoulder 133. It also provides internally the cylinder or chamber 134 which communicates with the threaded bore 132. The nut or fitting 136 is threaded into the bore 132 and in turn has the internally threaded bore 137 to receive the pin guide nut 138 which may bear at its lower end against the frangible seal or rupture disc 140 at the base of the threaded bore 137.

The pin guide nut 138 has the pin receiving bore or passage 139 extending axially therethrough, and the nut 136 has the axially extending bore or passage 141 therethrough. When the barrel 77 is threaded onto the barrel 135 at 131 to bear against the gasket 142, the rupture pin 129 extends co-axially with the bore 139 of the pin guide nut 138, and above the disc 140, and the pin 129 is of a diameter to pass downwardly through the bore.

The piston 145 has the flexible sealing cup 143 connected thereto by the cap screw 144, and is slidable within the cylinder or chamber 134. The piston 145 has coaxially connected to the lower end thereof the screw 146 which extends through the bore 147 of the coupling member 148 which in turn has the coupling member 149 connected thereinto. As shown in Fig. 2, this assembly of coupling members 148 and 149, with the screw 146, provides a self aligning coupling or connection.

The flanged nipple or connector 150 is included in the lower section or barrel 135, and is threadedly connected at 151 to the top portion 152 of the barrel 135. As shown in Figs. 2 and 4, the connector 150 has the ports 153 therethrough and the central guide sleeve 154 is provided to receive the valve stem or piston rod 155 which is connected at its top to the coupling member 149. The lower end 156 of this nipple 150 has the countersunken seat or surface 157 which serves as the valve seat for the upper valve element 158, which is rigidly connected to the rod or stem 155, and which has the seal ring 158' thereon to contact the seat 157.

The sample receiving chamber tube 160 is connected, at its upper end 159 to the flanged nipple or connector 150, and against the gasket 159' and at its lower end, to the flanged nipple or connector 161 and against the gasket 161'. In turn, the lower threaded end 162 of the nipple 161 receives the spear or nose plug 163.

The release rod 164 connects the upper valve element 158 to the release piston 165 which is slidable within the chamber 160' of the sample receiving tube 160 and which has the guide ring 171 thereon with the ports 173 therethrough. The ring 166 is shown in Fig. 2 below the ring 171, and is threadable at 167 into the tube 160 and has therein the countersunk seat 168.

The lower valve 170 has the slot 174 in the top thereof, and the arms 169 are pivotally mounted on the pins 175 which extend across the slot and have ends supported in the valve. The projections 176 of the arms 169 are engageable with the countersunk seat 168 of the ring 166 when locked into the position shown in Fig. 2 as will be hereinafter described. The upper end of the flanged nipple or connector 161 is countersunk at 177 to provide a seat for the seal ring 178 of the lower valve 170.

The stem or rod 179 of the valve 170 extends through the guide cylinder 181 of the connector 161, which has the ports 182 therearound. This rod 179 terminates in the head 183, which is threaded thereon, and the spring 184 surrounds the rod 179 and bears at its lower end upon the head 183 and at its upper end on the spring seat 185 which surrounds the rod and seats upon the guide cylinder 181. The nose plug or spear 163 is threadedly connected at 186 to the connector 161 and has the port 187 therein. Preferably a screen 185' surrounds the head 183, spring 184, and lower end of the rod 179, and such screen is connected to the ring 186' which is threaded at 187' into the plug 163.

With the barrel portion 152, connector 150, and interconnected pistons 165 and 145 assembled to locate the pistons at the relative positions shown in Fig. 2, and with the sample tube 160, connector 161, and parts therein assembled in the relative positions also shown in Fig. 2, assembly of these two portions of the barrel 135 may be completed by engagement at 135' of the threaded sections 150 and 160. This will bring the tapered end 165' of the piston 165 into engagement with the arms 169 to lock the projections 176 against the ring 166 and the releasable lock means thus afforded, initially positions the valves 158 and 170 in the sample receiving chamber 160' in open position.

Before the frangible disc 140 is put in place, and the guide nut 138 installed thereagainst, the chamber 134 and passage 141 are filled with a substantially non-compressible fluid 190. The plug 163, with ring 186' and screen 185' therein, is installed on the end 162 of the connector 161 to complete the assembly of the lower section 135.

There is then a completed flow passage for fluid through the spear port 187, the spear interior 189, the lower connector ports 182, and the connector passage 191 to the sample receiving chamber 160'. Within this chamber fluid may pass through the ring 166 and the ports 173 of the release piston ring 171. From the sample receiving chamber 160' fluid may flow through the passage 192 of the upper connector 150 into the bore 194 of the top portion 152 of the lower section or barrel 135. Finally the ports 195 provided in the wall of the portion 152, establish communication with the sampler exterior.

With the upper barrel section 70 and lower section 135 assembled by the engagement of the threads 130 and 131, the sampler is then lowered into the well to a desired level, as described hereinabove with reference to the operation of the modification of Figs. 1–2 inclusive. After the lapse of a predetermined time interval, as controlled by the clock 83, the plunger 89 moves downwardly against the arm 94, thereby pivoting the point 95 out of contact with the under-surface 101 of the head 96. This permits the trip magnet 98 to fall upon the partition 79.

The trip magnet 98 is installed with say, its north pole downwardly, and the armature magnet 115 must then necessarily be installed with its south pole upwardly, and the magnets have a pre-calculated magnetic attraction therebetween, which is too weak to draw them together when they are in their initially spaced apart relation. However, when the trip magnet falls and draws nearer the armature magnet, the magnetic attraction is sufficiently strong to attract the armature magnet upwardly against the tension of the spring 112, thereby pulling the point 127 to the right to release the plunger 120. This permits the spring pressed rupture pin 129 to perform the work of fracturing the frangible disc 140 for the upward displacement of the liquid from the piston chamber 134. This operation is based on the fact that the barrel 70 should be of some non-magnetic material so as not to affect the attraction of the magnets.

As the pressure of the fluid within the well acts upon the piston 145, this piston will move upwardly due to the pressure differential between the fluid pressure in the well and the pressure within the chamber 134 and thereabove. This resullting upward movement of the piston 145 draws the piston 165 out of contact with the projections 176 of the arms 169, and at the same time seats the valve 158 upwardly in the seat 157. The spring 184 acts against the head 183 to draw the valve 170 downwardly, as the arms 169 can now swing inwardly about the pins 175 and thereby pass downwardly through the ring 166. The valve 170 can then close against the seat 177 with the result that a true sample of well fluid, at the level to which the sampler has been lowered, is now trapped in the sample tube chamber 160'.

Broadly, this invention provides a sampling device adapted to be lowered into a well to take a sample of well fluid at the expiration of a predetermined time interval, such device including a fluid tight clock chamber separated from an air chamber therebelow by a partition across which magnetic forces are effective, the operation of such magnetic forces setting in motion other operative forces, including the fluid pressure of the well bore, to close a sample chamber to entrap a sample of fluid therein.

From the foregoing it can be seen that the device herein involved relates to a magnet positionable in a fluid tight chamber within a housing, such magnet being releasable by a time controlled means to move toward a partition wall across the housing to attract a second magnet in another chamber bordered by the partition, so that the movement of the second magnet toward the partition sets in motion means to actuate the device.

What is claimed is:
1. A sample taking device for wells comprising, a housing including a fluid tight upper compartment and a lower compartment, a partition separating said compartments, an upper magnet movable in said upper compartment towards said partition, a second magnet movable in said lower compartment by the mutual attraction of said magnets when the upper magnet is at the partition, yieldable means in said compartment initially locating said upper magnet spaced above said partition, a sample chamber in said lower compartment having a port therein through which well pressure fluid may pass into said sample chamber, a fluid pressure responsive port closing valve, lock means operative for initially holding said valve open, a timing device in said upper compartment operable after a predetermined time interval to release said upper magnet locating means to set said upper magnet in motion downwardly in said upper compartment toward said partition to draw said lower magnet upwardly thereto, and a releasable latch connected with the lower magnet and responsive to upward movement of the lower magnet for rendering said lock means inoperative.

2. A sample taking device for wells comprising, a housing, a frangible closure therein, a piston operable in said housing below said closure, a noncompressible fluid in said housing confined between said closure and said piston, a sample chamber within the housing below said piston having an opening in the wall of the housing for the entry of well fluid into said sample chamber, a rod extending from the piston into said sample chamber, a valve connected to said piston by the rod and operable upon upward piston and rod movement in response to well fluid pressure to close said opening into the sample chamber, said frangible closure serving to confine the noncompressible fluid for initially resisting piston movement and holding said valve open to well fluid entry and said frangible closure when ruptured serving to free the noncompressible fluid and permit upward movement of said valve means with said piston and rod to sample chamber closing position, a partition across said housing and spaced above said closure, an upper magnet in said housing biased for movement toward said partition, a releasable latch initially holding said magnet spaced above said partition, a lower magnet movable in said housing under magnetic attraction upon latch release and upper magnet movement to the partition and initially spaced below said partition with its uppermost pole opposite in polarity to the polarity of the lowermost pole of said upper magnet, a trigger supported in said housing below said partition and connected to said lower magnet for movement therewith, a spring actuated closure rupturing device initially latched in inoperative position by said trigger and releasable upon trigger movement for downward movement of the device to rupture said closure, and a timing device in said housing above said partition and operable after a predetermined interval to release said upper magnet latch and thereby permit said upper magnet to move downwardly to draw said lower magnet upwardly.

3. A sample taking device for wells comprising, a housing including a fluid tight upper compartment, a lower compartment, and a partition separating said compartments, a frangible closure across said lower compartment, a well fluid pressure responsive piston spaced below said closure and slidable in said lower compartment, a body of liquid filling the space between said closure and said piston as a stop to piston travel, a sample chamber in said lower compartment spaced below said piston and having a port therein through which well pressure fluid may enter said sample chamber, a valve for said sample chamber port, means connecting said valve to the piston for valve movement from an initial position in which the port is open to a position in which the port is closed upon pressure responsive piston travel, an upper magnet downwardly movable in said upper compartment toward said partition, a lower magnet upwardly movable in said lower compartment from an initial position spaced below said partition and having its uppermost pole opposite in polarity to the polarity of the lowermost pole of said upper magnet so as to be drawn upwardly by magnetic attraction upon downward movement of the upper magnet, a releasable latch initially holding said upper magnet above and in spaced relation to said partition, a spring actuated closure rupture device, a releasable latch holding said device in inoperative position and having an operative connection with the lower magnet for movement therewith, which releases said device for its spring actuation to rupture said frangible closure, a timing device in said upper compartment operatively connected with the upper magnet latch and operable after a predetermined interval to release said upper magnet latch to set said upper magnet in motion downwardly toward said partition for an upward pull upon said lower magnet, the resulting rupture of said frangible closure permitting the upward pressure of said well fluid against said piston to force said body of liquid above the ruptured closure for the closing movement of the valve and entrapment of a well fluid sample in said sample chamber.

4. A magnetically operated device comprising a housing including an upper fluid tight compartment and a lower compartment, a partition separating said compartments, a magnet housed in said upper compartment for downward movement toward said partition, a releasable latch mounted in the housing and engageable with said upper magnet for retaining said upper magnet against movement toward said partition, a lower magnet movable in said lower compartment from an initial position spaced below the partition, a time controlled means protectively housed in said fluid tight upper compartment and operatively connected with the releasable latch, said time controlled means being operable after a predetermined interval to release said upper magnet to attract said second magnet upwardly, and a work performing member responsive to the upward movement of said second magnet.

5. In a sampler for lowering into a well to trap a sample of well fluid, a sample receiving device having a well fluid entry port, a closure for said port movable between port opening and closing positions, a sealed compartment joined to said device, a permanent magnet mounted in said sealed compartment for movement between inoperative and operative positions, means co-operating with the closure to constrain closure movement from open position and operable in response to the magnetic force of said magnet when the latter is in its operative position to release said closure for movement to port closing position, and timing mechanism including a magnet positioning device protectively housed in said sealed compartment and operatively connected to said magnet to initially preclude magnet movement from its inoperative position and after a given time lapse to permit magnet movement to its operative position.

6. In a magnetically operative device, a sealed compartment, a support adjacent thereto, a permanent magnet biased for travel from an inoperative position to an operative position within said compartment, a work performing mechanism movably mounted by said support for movement from an inoperative position to an operative position under influence of the magnetic force of said magnet when the latter is in its operative position, means engaging said magnet to restrain its travel to operative position and preset timing mechanism housed in said sealed compartment and operatively connected to said restraining means and operative after a predetermined time interval to render the restraining means ineffective.

7. In a sampler for lowering into a well to receive a sample of well fluid, a sample receiving chamber having a closure valve to entrap therein a well fluid sample, releasable holding means to initially lock the valve in open position, a support for said sample receiving chamber, a sealed compartment in said support adjacent the chamber, a permanent magnet contained in said sealed compartment and biased for movement from an inoperative position to an operative position, a mechanism movably supported by said device and operably connected with said valve holding means and responsive to the force of said magnet when said magnet is in its operative position, for movement to release said valve holding means, and timing mechanism protectively encased in said sealed compartment and operatively connected to said magnet to restrain magnet movement and operative after a predetermined time interval to remove restraint to biased magnet movement to operative position.

References Cited in the file of this patent

UNITED STATES PATENTS

| | | |
|---|---|---|
| 2,147,983 | Lindsly | Feb. 21, 1939 |
| 2,161,557 | Clark | June 6, 1939 |
| 2,308,156 | Crump | Jan. 12, 1943 |
| 2,411,157 | Fene et al. | Nov. 19, 1946 |
| 2,577,210 | Ruska | Dec. 4, 1951 |